United States Patent [19]

Kyogoku et al.

[11] 4,352,114

[45] Sep. 28, 1982

[54] INK JET PRINTER WITH TEMPERATURE COMPENSATION

[75] Inventors: Hiroshi Kyogoku, Kawasaki; Shigemitsu Tazaki, Matsudo; Shigeru Okamura, Yokohama; Koji Terasawa, Mitaka; Yukio Kasugayama, Yokohama; Yoshihumi Hattori, Kawasaki, all of Japan

[73] Assignee: Canon Kabushiki Kaisha, Tokyo, Japan

[21] Appl. No.: 195,348

[22] Filed: Oct. 9, 1980

[30] Foreign Application Priority Data

Oct. 23, 1979 [JP] Japan ............................ 54-135917

[51] Int. Cl.³ ........................................ G01D 15/18

[52] U.S. Cl. ........................................ 346/140 R

[58] Field of Search ........................ 346/75, 140 PD

[56] References Cited

U.S. PATENT DOCUMENTS 3,914,772 10/1975 Kashio ................................ 346/75

4,275,402 6/1981 Kern ............................ 346/140 PD

*Primary Examiner*—George H. Miller, Jr.

*Attorney, Agent, or Firm*—Fitzpatrick, Cella, Harper & Scinto

[57] ABSTRACT

There is an ink jet printer in which an electrostriction element is associated with at least a part of an ink chamber for causing ink emission from an ink nozzle connected to said ink chamber in response to a voltage applied to the electrostriction element. Said voltage is changed in response to the ambient temperature and made higher or lower respectively in a low or high temperature.

2 Claims, 5 Drawing Figures

INK JET PRINTER WITH TEMPERATURE COMPENSATION

BACKGROUND OF THE INVENTION

1. Field of the Invention

The present invention relates to an ink jet printer for forming desired characters or images by emission of liquid ink in the form of droplets, and more particularly to such ink jet printer capable of realizing constant ink droplet emission regardless of the temperature dependence of ink viscosity.

2. Description of the Prior Art

There are already known and used various types of ink jet printer. Such ink jet printer is generally provided with an electrostriction element which is associated with a part of an ink chamber storing the ink and is deformed by the application of a determined voltage to reduce the volume of said ink chamber, thereby emitting an ink droplet with a diameter in a range of 50–100 $\mu$m from an ink nozzle of a corresponding diameter provided in said ink chamber. The ink suitable for used in such ink jet printer has to have certain physical properties for dot formation mechanism, and is provided generally with a viscosity in a range of 2–10 cp and a surface tension in a range of 40–50 dyne/cm$^2$. Among these properties, the viscosity has a particularly strong temperature dependence and may easily be located out of the appropriate range even in a temperature range of 0°–40° C. in which the apparatus has to show normal function. Particularly at a low temperature the normal ink emission is often hindered by a high viscosity.

In order to avoid such drawback there has been employed a heating device for maintaining the ink at an appropriate temperature. However, though such method is effective for achieving appropriate physical properties when the ink is maintained at a constant temperature, such method inevitably requires a certain time for heating the ink to a determined temperature after the power supply is turned on, thus causing a delay before the printer becomes functionable.

SUMMARY OF THE INVENTION

The object of the present invention is to provide an ink jet printer capable of compensating the temperature-dependent change in ink viscosity in a secure and inexpensive manner thereby enabling immediate use of the printer without delay in time as mentioned above.

DESCRIPTION OF THE PREFERRED EMBODIMENTS

Now the present invention will be clarified in detail by the following description of an embodiment thereof to be taken in conjunction with the attached drawings.

Figure 1:
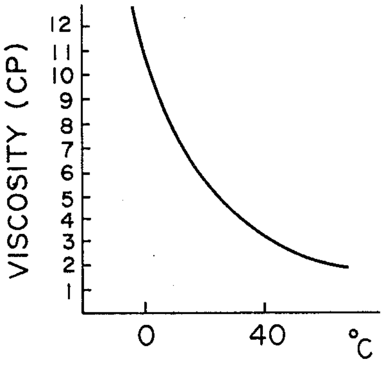
FIG. 1 is a chart showing an example of the viscosity-temperature characteristic of ink.

Although the viscosity of the ink to be employed in the ink jet printer should ideally remain constant regardless of the temperature, it in fact undergoes a temperature-dependent change as shown in FIG. 1, thus affecting the formation of ink droplet after emission or the fixation on the paper. This change generally assumes the form as illustrated in FIG. 1 though it varies to a certain extent by the constituents of the ink, and may result in a viscosity higher than 10 cp at 0° C.

Figure 3:
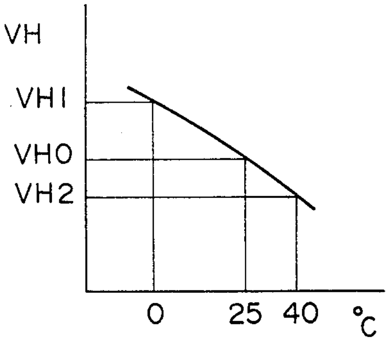
FIG. 3 is a chart showing an example of the voltage applied to the electrostriction element as a function of temperature according to the present invention.
Figure 2A:
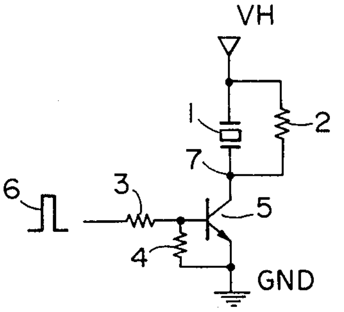
FIG. 2A is a circuit diagram showing an example of the drive circuit for the electrostriction element in the conventional ink jet printer.
Figure 2B:
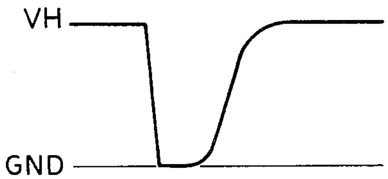
FIG. 2B is a waveform chart showing the voltage applied to said electrostriction element.

FIG. 2A shows an example of the ordinary drive circuit for electrostriction element, wherein there are shown an electrostriction element 1, resistors 2, 3, 4 and a power transistor 5. An ink emission control pulse signal 6 is supplied to the base resistor 3 to shift the transistor 5 to the conductive state, whereby the potential at a junction 7 between the electrostriction element 1 and the collector of the transistor 5 is reduced rapidly as shown in FIG. 2B to drive said electrostriction element. The voltage $V_H$ supplied to the element 1, as shown in FIGS. 2A and 2B, which is maintained always constant in the conventional method, is controlled, according to the present invention, as a function of temperature as shown in FIG. 3. More specifically, according to the present invention, the electrostriction element is driven with a higher voltage at a lower temperature where the viscosity is higher and is driven with a lower voltage at a higher temperature where the viscosity is lower, thereby achieving an essentially constant ink emission regardless of the temperature. In FIG. 3 $V_{H1}$, $V_{H0}$ and $V_{H2}$ respectively show the applied voltages at 0°, 25° and 40° C.

Figure 4:
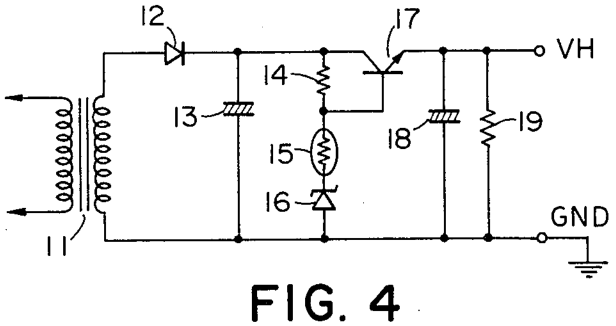
FIG. 4 is a circuit diagram showing an example of the power supply circuit for obtaining the characteristic shown in FIG. 3.

FIG. 4 shows an example of the power supply circuit providing the change in applied voltage $V_H$ as shown in FIG. 3, wherein an AC voltage is supplied to the primary coil of a transformer 11 of which secondary coil is connected to a rectifying diode 12. The rectified voltage is smoothed by a condenser 13 and then supplied to a serial circuit composed of a resistor 14, a thermister 15 and a Zener diode 16 and to the collector of a transistor 17 of which base is connected to the junction between said resistor 14 and thermister 15. The output voltage from the emitter of said transistor 17 is taken out as the voltage $V_H$ through a filter composed of a condenser 18 and a resistor 19. The resistance of said thermister 15 decreases at a higher temperature to increase the voltage across the resistor 14, whereby the base potential of the transistor 17 is reduced to accordingly lower the emitter potential $V_H$. On the other hand, at a lower temperature, the resistance of the thermister 15 becomes higher, thus elevating the voltage $V_H$. The supply voltage $V_H$ to the electrostriction element is varied in this manner through the use of a thermister, thereby achieving the temperature-dependent drive as shown in FIG. 3.

As explained in the foregoing, the present invention, in which the volume change in ink chamber is controlled by the change in power supply voltage to the electrostriction element in response to the temperature thereby achieving a constant ink emission irrespective of the temperature, allows to obtain a stable ink emission without delay even immediately after the power supply is turned on and with a simple and inexpensive circuit. It will be understood that the present invention is not limited to the use of the circuit structure shown in FIG. 4 but includes the use of any other power supply circuits being thermister or using any other temperature-sensitive elements.

What we claim is:

1. An ink jet printer for ejecting a single ink droplet in response to each applied input pulse, said ink jet printer comprising:

an ink chamber for storing ink therein;

an electrostriction element for effecting a change of capacity of said ink chamber;

a temperature sensitive element for sensing the temperature of ambient atmosphere; and curcuit means responsive to each input pulse applied thereto for straining said electrostriction element causing ejection of only one ink droplet from said ink chamber for each applied input pulse, wherein said circuit means varies the degree of strain of said electrostriction element in accordance with the temperature sensed by said temperature sensitive element.

2. An ink jet printer according to claim 1, wherein said circuit means is adapted to operate in such manner that the degree of strain of said electrostriction element is increased when said temperature sensitive element senses a relatively low temperature and the degree of strain of said electrostriction element is decreased when said temperature sensitive element senses a relatively high temperature.

* * * * *